United States Patent [19]

Shrum

[11] 3,815,710

[45] June 11, 1974

[54] SEISMIC SENSING APPARATUS

[75] Inventor: William M. Shrum, Miraleste, Calif.

[73] Assignee: Maxton Manufacturing Company, Los Angeles, Calif.

[22] Filed: Oct. 21, 1971

[21] Appl. No.: 191,281

[52] U.S. Cl. ............................ 187/29 R, 340/15.5 R
[51] Int. Cl. .............................................. B66b 1/00
[58] Field of Search ......... 187/29 R; 340/15, 15.5 R

[56] References Cited
UNITED STATES PATENTS 3,714,456  1/1973  Krohmer .............................. 340/15
3,726,364  4/1973  Citrin ................................ 187/29 R Primary Examiner—George Harris
Assistant Examiner—Fred E. Bell
Attorney, Agent, or Firm—Warren T. Jessup

[57] ABSTRACT

Sensing circuitry to protect an elevator car from striking a dislodged counterweight or other structure wherein a seismic sensor is coupled through control circuitry to control the directional movement of the car. Upon the seismic sensor detecting a seismic or other disturbance of predetermined magnitude, with the car located adjacent to or above the counterweight only continued upward movement is permitted, and with the car located adjacent to or below the counterweight only continued downward movement is permitted.

4 Claims, 2 Drawing Figures

INVENTOR.
WILLIAM M. SHRUM
BY JESSUP & BEECHER
ATTORNEYS

INVENTOR.
WILLIAM M. SHRUM
BY JESSUP & BEECHER
ATTORNEYS

SEISMIC SENSING APPARATUS

BACKGROUND OF THE INVENTION

The field of this invention relates to elevators and more particularly to seismic sensing circuitry which limits the movement of the elevator car as well as to preclude the car from coming into contact with the counterweight or other structure thereby damaging the car and/or the counterweight. Thus other structures may include parts of the building structure such as divider beams, counterweight rail brackets, etc.

This invention is primarily concerned with elevators which can be broadly defined as material and/or personnel handling machines that lift and lower a load through a fixed vertical path of travel with intermittent motion. Although the apparatus of this invention is designed to be employed in combination with elevator structures which are located within high-rise buildings, it is not intended to be specifically limited to only such elevators.

The conventional elevator structure within a high-rise building basically includes the use of an elevator car which is connected to cables which are to be conducted from the basement of the building or to the roof of the building through a system of pulleys. The elevator car is to be located on one side of the pulley system with a counterweight, to balance the car's weight, to be located on the other side of the pulley system. The counterweight is normally designed to move within a guide which is fixedly secured within the elevator shaft. Both the car and the counterweight are to pass each other at the midpoint of travel of the car. The actual distance between the counterweight and the car when passing is quite small, usually no more than a few inches.

It has been discovered that during periods of seismic disturbances of sufficient magnitude, the movement of the building may be sufficient to cause the counterweight of the elevator to be dislodged from its guide. This dislodgement may be sufficient to put the counterweight in the path of the elevator car. Therefore, when the car is moved and attempts to pass the counterweight, the car will contact the counterweight. In such instances, substantial damage is likely to occur to the elevator structure as well as submitting any persons which may be in the elevator to potential injury.

SUMMARY OF THE INVENTION

The apparatus of this invention relates to seismic sensing circuitry which is associated with the electrical control circuitry which effects movement of the elevator car. Basically, the sensing circuitry of this invention relates to elevator car location circuitry and seismic sensing circuitry. The location circuitry is activated in a first manner with the elevator car located above the counterweight, and is activated in a second manner with the elevator car located below the counterweight. The seismic sensing circuitry is coupled to the location circuitry so upon a seismic disturbance of a sufficient magnitude occurring, downward direction of the elevator is prevented with the car located above the counterweight. Similarly, if the car is located below the counterweight, upward movement of the car is prevented.

DETAILED DESCRIPTION OF THE SHOWN EMBODIMENT

Figure 1:
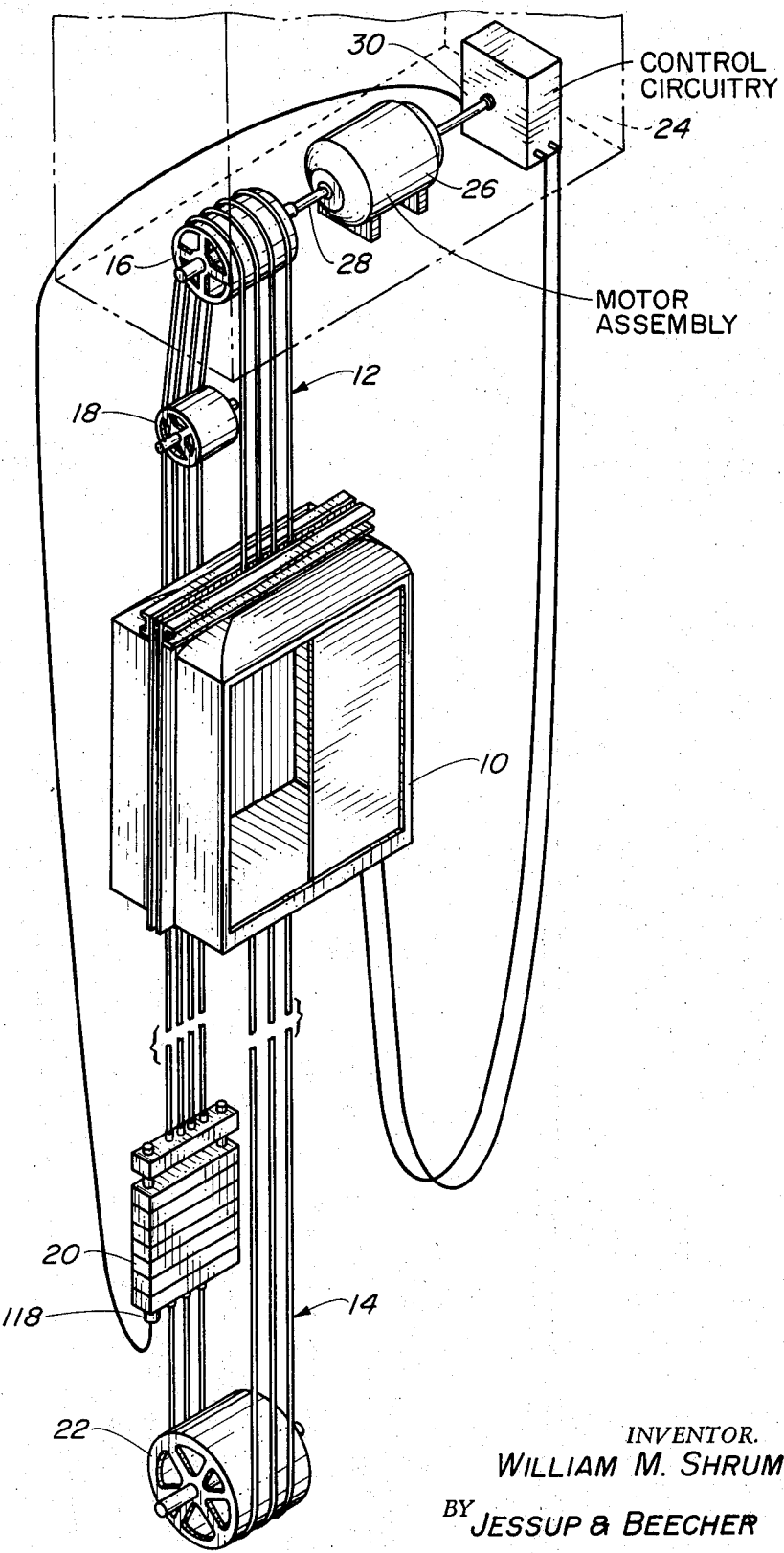
FIG. 1 is an isometric view of a typical elevator structure diagrammatically depicting the connection of the circuitry of this invention to the elevator structure.

Referring particularly to the drawing, there is shown in FIG. 1 a conventional elevator car 10 to which is secured to the top of the car the hoisting cables 12 and to which is secured to the bottom of the car the compensating cables 14. The hoisting cables 12 extend in an upward direction around drive pulley 16 and idler pulley 18 and are fixedly connected to the counterweight 20. The compensating cables 14 cooperate with the pulley 22 prior to being connected to the counterweight 20. It is to be understood that the previously described elevator structure is to be located within an elevator shaft (not shown) of a building (not shown). Located upon the roof of the building is an enclosed area 24. The drive pulley 16 is to extend within the enclosed area 24 with the drive pulley 16 being driven by a motor assembly 26 through a shaft 28. The motor assembly 26 is electrically connected through control circuitry 30 to the elevator car 10.

Figure 2:
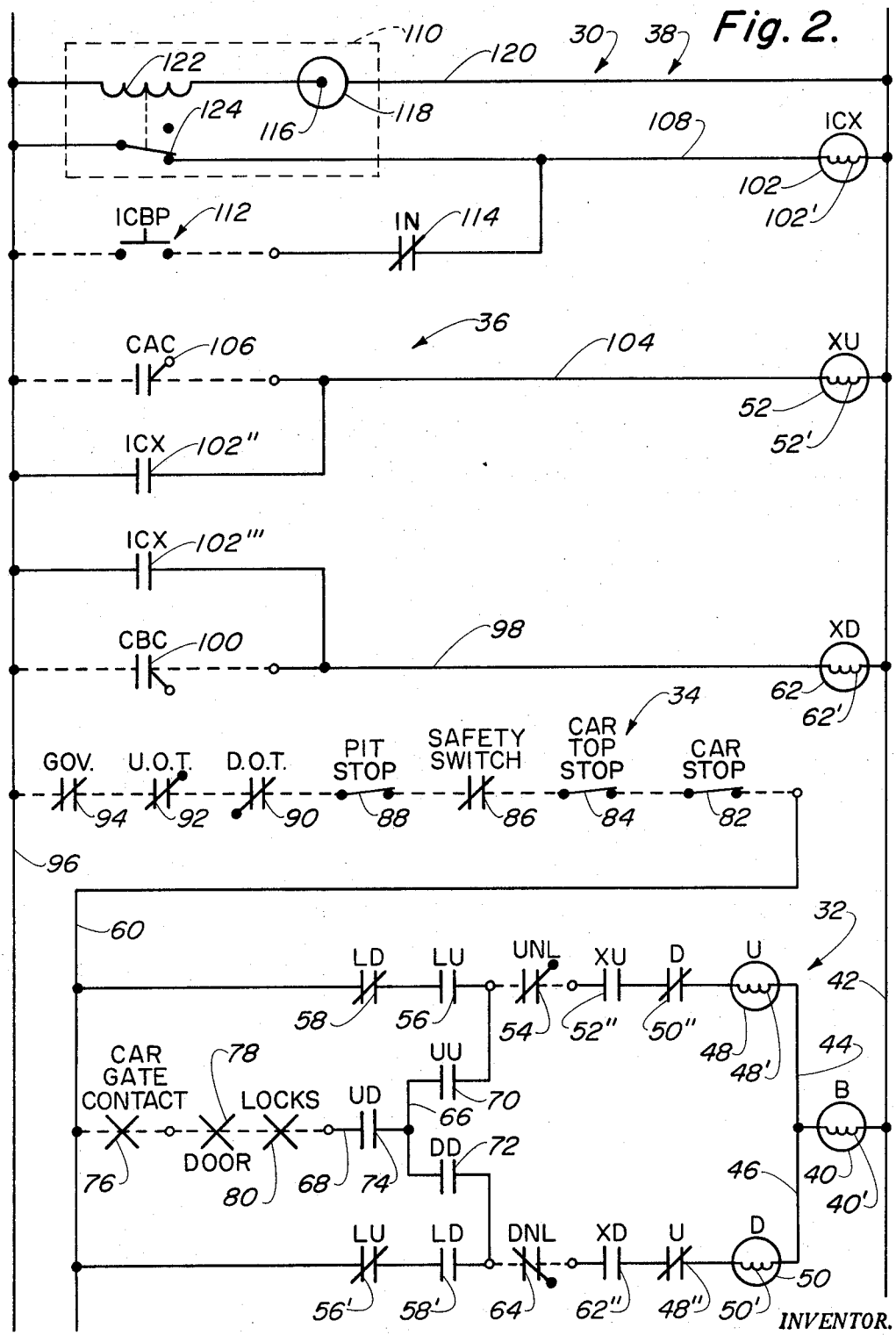
FIG. 2 is a schematic, diagrammatic illustration of the overall circuit of this invention embodying the sensing circuitry of this invention and the conventional elevator operating circuitry.

Referring particularly to FIG. 2 of the drawing, the control circuitry 30 is clearly shown. The control circuitry 30 is divided into an operation circuitry 32, safety circuitry 34, location circuitry 36 and sensing circuitry 38. The operation circuitry 32 and the safety circuitry 34 represent conventional elevator operating circuitry and will be described in accordance with this invention only to illustrate the intended environment in which the sensing circuitry of this invention is to be employed.

It is to be understood that this invention is being described in relation to the overhead type of elevator as shown in FIG. 1. However, this invention may be readily employed upon basement types of elevators or any other type of elevator structure without departing from the scope of this invention.

The operating circuitry 32 includes the use of a brake relay 40 which is coupled to line conductor 42. Relay 40 includes relay coil 40'. The brake relay 40 is to effect a stopping of the car 10 at each prescribed level. The brake relay 40 is also coupled to conductor 44 of the upward direction circuit path and also to conductor 46 of the lower direction circuit path. Conductor 44 is coupled to relay coil 48' of an up direction relay 48, a down direction relay contact 50" of the relay 50, the relay contact 52" of the up permissive relay 52, the up normal limit switch 54, the up leveling relay contact 56, the down leveling relay contact 58, and intermediate line conductor 60. The up direction relay 48 permits the car to move in the up direction and when doing so, the down direction contact 50" prevents the downward directional movement of the elevator car. The up permissive relay 52 is directly a part of this invention and is capable of deactivating the upper circuit path as will be explained further on in the specification. The up normal limit switch 54 is to discontinue further upward movement of the car upon the car reaching the maximum level. The up leveling relay 56 is to effect a gradual slow down of the car prior to coming to a stop. The down leveling relay contact 58 places the down leveling circuit in an inactive position when traveling in the up direction.

In a similar manner, the down directional circuitry which includes a conductor 46 is connected to the down direction relay coil 50' of the relay 50, the contact 48'' of the up direction relay 48, the contact 62'' of the down permissive relay 62, the down normal limit switch 64, the down leveling relay contact 58, the up leveling relay contact 56', and line conductor 60. When traveling in the downward direction, the down direction relay 50 is closed with the up direction switch 48 being open. The function of the down permissive relay 62 is to be capable of deactivating the down direction circuit as will be explained further on in the specification. The down normal limit switch 64 is to prevent further downward movement of the car upon reaching the lowest desired level of travel. When traveling in the downward direction, the down leveling relay contact 58' is closed or active with the up leveling relay contact 56' being rendered open or inactive.

To effect the opening of the doors of the elevator car upon arriving at a particular level, a door opening circuit is provided. A conductor 66 is coupled to the up circuit path intermediate the up normal limit switch 54 and the up leveling relay contact 56. Conductor 66 is also connected to the down circuit path intermediate the down leveling relay 58' and the down normal limit switch 64. Coupled within conductor 66 is an up direction pilot relay contact 70 and a down direction pilot relay contact 72. A conductor 68 is coupled to conductor 66 intermediate relay contacts 70 and 72. Contact 70 is to be activatd only during upward movement of the car with contact 72 only being activated during downward movement of the car. Upon either of the contact 70 and 72 being activated, the auxiliary relay contact 74 is also to be activated. Upon the elevator car coming to a rest at a particular level, the gate of the elevator car and the doors to the particular level are opened by the car thereby opening gate contact 76 and the door locks 78 and 80. Conductor 68 is also coupled to conductor 60.

The foregoing description of the operation circuitry 32 is to be restricted by means of the safety circuitry 34. For this reason coupled within the line conductor 60 is a certain number of manually activated or mechanically activated switches which place certain operating restrictions on the operation circuitry 32. The safety circuitry 34 includes a switch 82 which upon being manually activated is to effect complete stopping of the car. A switch 84 is also employed, when activated, stops the car 10 when it reaches the uppermost level or adjacent the roof of the building. The safety switch 85 is to be automatically actuated upon the elevator structure malfunctioning. Switch 88 is to stop the elevator car at the lowermost level. Switch 90 is to prevent overtravel in the down direction. Switch 92 is to prevent overtravel in the up direction. Switch 94 is to prevent overspeed of the elevator car in either direction and is to be directly connected to a governor mechanism (not shown) which is associated with the elevator structure. Conductor 60 is also coupled to a ground line conductor 96.

The foregoing described safety circuitry 34 and the operation circuitry 32 are deemed to be conventional and do not directly form a part of this invention. It is for this reason that a detailed explanation of the circuitries 32 and 34 has not been included but the foregoing cursory explanation is believed to be sufficient for this application.

The circuitry of this invention is related to the location circuitry 36 and the sensing circuitry 38. The location circuitry 36 includes a line conductor 98 which is coupled between conductors 42 and 96. Within the line conductor 98 is located the coil 62' of the down permissive relay 62 and the selector contact 100. The contact 100 is closed with the elevator car 10 located below the counterweight 20 and is open if the car 10 is adjacent to or above the counterweight 20. The selector contact 100 is to be physically actuated by movement of the elevator car 10. Coupled in parallel about the selector contact 100 is the inertia relay contact 102'''.

The location circuitry 36 also includes a line conductor 104 which is located between line conductors 42 and 96. Within the line conductor 104 is located the coil 52' of the up permissive relay 52, and a selector contact 106 which is closed when the car 10 is located above the counterweight 20 and is open when the car 10 is adjacent to or below the counterweight 20. Also, coupled in a parallel manner about contact 106 is the inertia contact 102''.

The sensing circuitry 38 includes a line conductor 108 which is coupled to line conductors 42 and 96. Connected within the line conductor 108 is the coil 102' of the inertia relay 102 and a switch 124 of an inertia contact 110. Illustratively, the inertia contact 110 would be composed of structures such as a plumb bob 116 which is suspended vertically within a ring 118, the ring 118 surrounding the plumb bob 116 and being normally spaced therefrom. Upon the plumb bob 116 being moved sufficiently by means of a seismic disturbance, the plumb bob 116 will come into contact with a portion of the ring 118 establishing a completed electrical circuit within line conductor 120. This completed electrical circuit will then activate an apparatus such as a pulse relay 122. The pulse relay 122 effects opening of switch 124 and maintains such open even if the plumb bob or other sensor 116 is removed out of contact with ring 118.

It is to be noted that the plumb bob arrangement would not be activated if there was a power failure prior to or coincident with the shock or disturbance. Therefore alternatively, it may be desirable to employ a maintained closed contact that would be opened by a disturbance or shock. This can be simply accomplished by making the switch 124 sensitive to a shock or disturbance.

Located parallel to the switch 124 is a bypass switch 112 and a contact 114 of an inspection relay. The bypass button 112 is to be used when it is desired to negate the effect of the inertia contact 110. The inspection relay 114 will be explained further on in the specification.

The description of operation of the seismic sensing apparatus of this invention is as follows: The switch 124 is normally closed and is manually resetable upon being activated by a seismic disturbance of sufficient magnitude. The contact 110 is to be normally mounted directly upon the counterweight 20 and connected to the control circuitry 30 by a traveling cable. However, an elongated slip ring assembly could be employed instead of the traveling cable. Additionally, in certain installations, it may be desirable to mount the contact 110 other than on the counterweight 20. Under normal conditions, the switch 124 is closed and relay 102 is energized. With relay 102 energized, relays 52 and 62 are also energized regardless of the position of the car 10 and the counterweight 20. In other words, with the contact 110 closed, the car 10 is permitted to move in either the upper direction or the downward direction.

In the event of a seismic disturbance of a magnitude exceeding that for which contact 110 is established, switch 124 will open and remain open de-energizing coil 102' of relay 102. The relay contacts 102'' and 102''' which parallel the selector contacts 106 and 100, will also open. If at this time the elevator car 10 is located above the counterweight 20, then contact 106 is closed and contact 100 is open. In this position, relay 62 will be de-energized resulting in opening of the contact 62''. Therefore, the car 10 cannot travel in the down direction. However, because contact 106 is closed, the coils 52' of the up permissive relay 52 remains energized permitting upward movement of the car 10. Upon the car 10 reaching the uppermost level within the building, the car 10 would not be capable of further movement.

In a similar manner, if the car 10 is located below the counterweight 20, then contact 100 is closed and contact 106 is open. Upon a seismic disturbance occurring of sufficient magnitude, the circuit to the coil 48' of the up direction relay 48 will be opened by the contact 52''. As a result, car 10 is not capable of travel in the up direction and upon reaching the lowermost level, will be prevented from further travel in either direction.

If per chance the shock or disturbance occuring at the time the counterweight and car are located directly adjacent each other, the contacts 100 and 106 will both be opened to prevent car operation in either direction.

To reset the switch 124, it will be necessary to place the car on inspection, that is, de-energizing the manually closed inspection relay. It is necessary to manually close the bypass switch 112 and then to operate the car 10 to a position opposite the counterweight 20 since the inertia contact 110 is to be located upon the counterweight. Upon such movement being effected, the party desiring to reset the switch 124 leaves the confines of the car and then accomplishes such resetting. During this resetting, the party is to also observe the condition of the counterweight and if such is dislodged, then the counterweight can be physically moved back to its desired position.

What is claimed is:

1. In combination with vertical elevator structure, said elevator structure including a movable car, control circuitry for effecting operation of said car, a counterweight connected to said car, the improvement comprising;

said control circuitry including sensing circuitry to detect a seismic disturbance of predetermined magnitude, said control circuitry including operation circuitry to effect normal operation of said car, said sensing circuitry being capable of altering said operation circuitry so that said car is not capable of passing directly adjacent said counterweight.

2. The combination as defined within claim 1 including: said control circuitry including location circuitry, said location circuitry including a first circuit path and a second circuit path, first selector contact means coupled within said first circuit path to transmit energy when said car is located above said counterweight, a second selector contact coupled within said second circuit path to transmit energy when said car is located below said counterweight, with said car located above said counterweight said second selector contact being deactivated, with said car located below said counterweight said first selector contact being deactivated, whereby upon activation of said sensing circuitry with said car located above said counterweight only continued upward movement of said car being permitted, whereby upon activation of said sensing circuitry with said car located below said counterweight only continued downward movement of said car being permitted.

3. The combination as defined within claim 1 wherein:

said sensing circuitry includes a seismic sensitive contact which is to be activated by a seismic disturbance of predetermined magnitude, said seismic sensitive contact being attached directly to said counterweight.

4. The combination as defined within claim 1 wherein:

said sensing circuitry including a bypass circuit, said bypass circuit to be manually actuatable for effecting movement of said car thereby negating the effect of said seismic sensitive contact within said sensing circuitry.

* * * * *